April 2, 1940. C. W. JAMESON 2,195,726
SPECIMEN HOLDER FOR COLOR FADING TESTING
Filed July 6, 1937
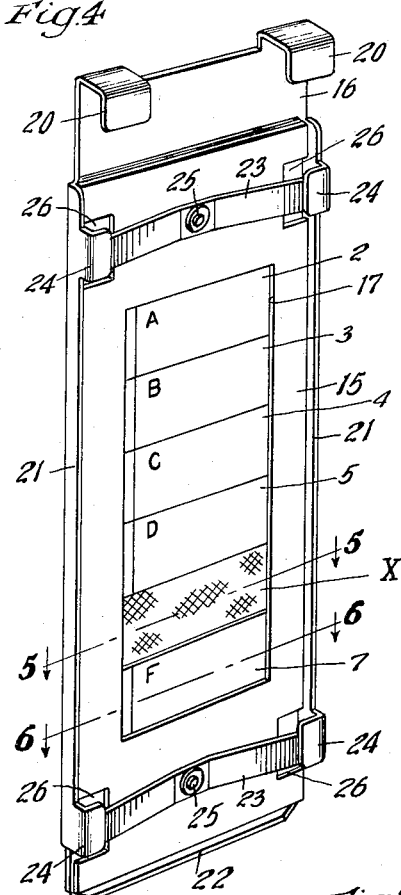
Inventor
Clarence W. Jameson
By George I. Haight
Atty.

Patented Apr. 2, 1940

2,195,726

UNITED STATES PATENT OFFICE 2,195,726

SPECIMEN HOLDER FOR COLOR FADING TESTING

Clarence W. Jameson, Lombard, Ill., assignor to Atlas-Ometer Co., Chicago, Ill., a corporation of Illinois Application July 6, 1937, Serial No. 152,233

2 Claims. (Cl. 73—51)

My invention relates to improvements in the art of testing materials for fastness to light and has particular reference to a device by which the samples or specimens to be tested are conveniently held for subjection to the testing light source.

It is customary in the "Fade-ometer" method of determining the fastness of color to light to expose samples or specimens of the material embodying the color to a source of light for a definite period of time which has been determined to bear a standardized relation to exposure to sunlight.

My invention is generally adapted to the exposure of samples or specimens to sunlight, or any other suitable source of ultraviolet or other radiant energy, but it is especially applicable for use in connection with the "Fade-ometer" which is in general use throughout the world.

My invention involves a holder with which a sample or specimen of the material to be tested is associated for testing and for a permanent record thereafter. Preferably the device is in the form of a mask which is secured to the sample and which has a plurality of sections adapted to be successively removed from portions of the area of the sample to expose said area to the source of testing light. This device, with its associated tested sample, then becomes a permanent record with all of the data relating to the test convenient for filing.

In the accompanying drawing, I have illustrated a preferred embodiment of my invention, but it will be obvious from the following description and appended claims that various changes in the construction and operation of the device may be made without departing from the spirit of the invention.

In the drawing,

Fig. 1 is a view of the sheet forming the mask before it is folded and containing the record data;

Fig. 2 is a view of the mask folded about and secured to the sample to be tested, showing one of the sections swung away from the portion of the sample to be exposed;

Fig. 3 is an enlarged detail section on the line 3—3 of Fig. 2, showing the means for securing the sample in the folded mask;

Fig. 4 is a perspective view of a holder frame for the mask and its associated sample;

Fig. 5 is an enlarged detail section on the line 5—5 of Fig. 4;

Fig. 6 is a similar section on the line 6—6 of Fig. 4; and

Fig. 7 is a still further enlarged view of the left-hand portion of the section of Fig. 5.

Referring more particularly to Fig. 2, a sample or specimen X is illustrated within the folded mask and is intended to represent any material which is to be tested by exposure. It is there illustrated as a piece of fabric of elongated rectangular form and of suitable size to conform to the mask. The mask Y is in the form preferably of a rectangular sheet of paper, cardboard, or other suitable material which can be made inexpensive and at the same time opaque to the transmission of light. In the present form, one side of the sheet, which constitutes the front side, is preferably white, and the opposite side, which constitutes the inner face when the sheet is folded, is preferably black. The sheet is adapted to be folded upon itself on the line Z, as shown in Figure 2, and when so folded constitutes a two-leaf or flap folder with that flap on the right-hand side of the line constituting the front or masking flap, and the portion on the left-hand side of the line Z constituting the rear flap.

The front or mask flap is divided into a plurality of sections 1, 2, 3, 4, 5, 6, 7, and 8, these sections being formed by slitting the sheet on parallel spaced-apart lines 9. These slits extend from the right-hand margin of the sheet to the folding line Z. Thus the cover or mask flap is divided into a number of individual sections which are joined to the body of the sheet along the line Z which form hinges, so to speak, on which the sections can be swung to fold them upon the back or rear flap, as shown more clearly in Figs. 2 and 7. In Fig. 2, the section 6 is shown in the act of being folded completely around to the rear and upon the rear flap, thus exposing the portion of the area of the sample X which it would otherwise cover. Normally the sections are in the same plane, but in Fig. 1 they are shown slightly out of this plane for the sake of clearer illustration.

The upper and lower end sections 1 and 8 respectively are intended to remain closed so that the sample X can be secured thereto to hold the sample and mask folder in proper relation. The sample may be fastened therein by any suitable means, such as small staples 10 (Fig. 3) adapted to bind the rear flap of the folder and the sections 1 and 8 of the front flap together with the sample between them. This holds the sample against shifting or moving in the folder and ties them together for filing. The intermediate sections 2 to 7 thus serve as individual or independent masks, each covering a portion of the area of the sample and each capable of being removed from the area which it covers by folding it back upon the rear flap to expose that portion of the area of the sample. They may be all folded back at once, or any one or more of them so folded, or any combination thereof.

It is preferable that the sample be tested by exposing adjacent portions of its area during different periods of time, and to this end the portions of the area of the sample are successively exposed during different periods of time. For instance, a test may be started by arranging the sections so that the lowermost movable section 7 remains in masking position throughout the tests, thus retaining the original color condition of the sample. The test is started by folding back the section 6 to expose the area of the sample which it otherwise covered. Then, as the time progresses, each of the remaining sections 5, 4, 3, and 2 may be successively folded back to expose the area portions which they otherwise cover. Thus, the portion corresponding to the section 6 would be given the longest period of exposure to the light, the portion corresponding to section 5 would be given the next longer period, and so on.

To illustrate further, the area corresponding to section 6 would be first exposed, say for six hours, then the flap 5 removed and the corresponding area be exposed for six hours, then the flap 4 removed and the corresponding area be exposed for six hours, and so on.

If all of the sections 6 to 2 are thus successively uncovered, an area corresponding to section 2 would have a six-hour exposure, and that corresponding to 3 would have a twelve-hour exposure, and that corresponding to 4 would have an eighteen-hour exposure, and that corresponding to 5 would have a twenty-four hour exposure, and that corresponding to 6 would have a thirty-hour exposure.

By testing the sample in this manner, the area given the longest period of exposure would be adjacent the original area covered by section 7, so that the contrast would be greatest between these two. The other sections above would show the extent or degree of fading for the different periods of time of exposure.

The mask sheet is also intended to serve as a record of the test. In Fig. 1 it will be seen that the faces of the sections of the front cover are provided with identifying data, for instance, the upper section 1 is provided with such data as to identify the sample being tested, such as the card number and data, the starting and finishing of the test, and material or number being tested. Each section is provided with data relating to the testing of the corresponding portion of the sample. Each section is identified with letters A, B, C, D, E, and F, and each provided with a space for inserting information as to hours and dates and whether the exposures were made during the morning or afternoon. The sections B to F carry the number of hours of exposure for itself and the section preceding it, and a total of hours to which it and the preceding section or area was exposed. The lower section 8 is provided with spaces identified by the same letters as the masking sections, so that the running record from each one of the sections may be carried to the lower section as a convenient record.

After the tests have been completed, the unit consisting of the folded mask and the sample fastened between the folded flaps thereof as above described, can be filed as a card in a suitable file, or it may be fastened in another folder and that folder filed in a suitable drawer or cabinet in the manner of a card index or folder index.

In order to carry the masked unit and hold the masking sections in proper position during the tests, I provide a suitable frame (Figs. 4 to 7) which consists mainly of two flat plate members 15 and 16, between which the masked unit is clamped and which are provided with window openings 17 and 18 through which the sample and mask sections are exposed. The plate 16 of this holder frame is provided at its upper end with a pair of hooks 20 by which the frame may be suspended from the support provided therefor in the testing machine. The plate 16 has side flanges 21 and a lower end flange 22 which serve to properly position the masked unit with respect to the window, the sheet Y being preferably of such dimensions that when it is folded as above described it will fit within the area defined by the flanges 21 and 22.

The plate 15 of the holder frame is removably clamped in position by means of spring clips 23, the ends of which are adapted to engage beneath ears 24 formed on the flanges 21 of the other plate adjacent the ends thereof. The spring clips are pivotally mounted at 25 on the plate 15 so that they may be rotated into and out of engagement with the ears 24.

The width of the windows 17 and 18 is preferably less than the width of the front or masked flap of the unit, so that the edges of the plate will engage the margins of the sections in order to snugly clamp them flat against the sample so that the light cannot enter through the slits between the sections, whereby the line of contrast between adjacent faded areas of the sample will be sharp.

The plate 15 has notches 26 in its edges contiguous to the ears 24, so that the plate can be readily removed and replaced without interference with the ears. Both plates 15 and 16 have the windows 17 and 18 so that either side of the holder frame may be presented to the light, the masked unit sample being placed therein accordingly.

I claim:

1. In a masking device for use in connection with the testing of samples of color or fastness to light, the combination of a sheet of paper folded lengthwise upon itself to enclose between its folds a sample to be tested, one of said folds having end sections and a plurality of transverse intermediate movable sections normally covering the face of the sample and adapted to be folded upon the other fold away from the face of the sample to expose the corresponding area thereof, means for securing said end sections to the sample and to the other fold, and a frame for said device adapted to hold said folded sections and having a window for exposing the movable sections and exposed area of the sample.

2. In a masking device for use in connection with the testing of color for fastness to light, the combination of a sheet of paper rectangular in shape and folded upon itself upon a line intermediate its width, to form a folder having front and rear flaps, adapted to secure a sample positioned between said flaps, said front flap adapted to serve as a mask for the sample positioned between said flaps, said front flap being divided into end sections and a plurality of intermediate sections by slits extending from the margin of said flap to said folding line, means securing the sample to said end sections and said rear flap, and a frame comprising two clamping members between which said folded sheet with the sample therein is clamped, said frame having a window exposing said intermediate sections and the area of the sample exposed when said intermediate sections are removed from the corresponding portions of the sample.

CLARENCE W. JAMESON.